United States Patent [19]

Deve

[11] Patent Number: 5,501,906
[45] Date of Patent: Mar. 26, 1996

[54] CERAMIC FIBER TOW REINFORCED METAL MATRIX COMPOSITE

[75] Inventor: Herve E. Deve, Minneapolis, Minn.

[73] Assignee: Minnesota Mining and Manufacturing Company, St. Paul, Minn.

[21] Appl. No.: 293,812

[22] Filed: Aug. 22, 1994

[51] Int. Cl.⁶ ........................... B32B 9/00
[52] U.S. Cl. .................. 428/366; 428/368; 428/388; 428/389
[58] Field of Search .................. 428/368, 396, 428/366, 388, 389

[56] References Cited

U.S. PATENT DOCUMENTS

| | | | |
|---|---|---|---|
| 4,036,599 | 7/1977 | Dhingra | 428/608 |
| 4,338,132 | 7/1982 | Okamoto et al. | 75/208 R |
| 4,518,625 | 5/1985 | Westfall | 427/37 |
| 4,831,707 | 5/1989 | Goddard et al. | 29/419.1 |
| 4,961,990 | 10/1990 | Yamada et al. | 428/240 |
| 5,137,781 | 8/1992 | Lahijani et al. | 428/364 |
| 5,164,229 | 10/1992 | Hay | 427/226 |
| 5,206,085 | 4/1993 | Nakagawa et al. | 428/372 |
| 5,238,741 | 8/1993 | Knights et al. | 428/366 |

FOREIGN PATENT DOCUMENTS

0502426A1   9/1992   European Pat. Off. .

OTHER PUBLICATIONS

Chappell et al., *Journal of Materials Science*, "The Fabrication of Ceramic–Coated Carbon Fibre Duplex Elements", 9:1933–1948 (1974).

Zhenhai et al., "Effect of Fibre Distribution On Infiltration Processing and Fracture Behaviour of Carbon Fibre–Reinforced Aluminium Composites", *Z. Metalkde* 766–768.

Primary Examiner—Christopher W. Raimund
Attorney, Agent, or Firm—Gary L. Griswold; Walter N. Kirn; Robert W. Sprague

[57] ABSTRACT

A fiber-reinforced composite that includes at least one tow in a metal matrix. The tow includes a plurality of continuous ceramic fibers held together by a carbonaceous matrix.

12 Claims, 1 Drawing Sheet

CERAMIC FIBER TOW REINFORCED METAL MATRIX COMPOSITE

STATEMENT AS TO FEDERALLY SPONSORED RESEARCH

This invention was made with support from DARPA (Contract No. MDA 972-90-C-0018). Accordingly, the U.S. government may have certain rights in the invention.

BACKGROUND OF THE INVENTION

1. Field of the Invention

This invention relates to fiber-reinforced composites.

2. Description of the Related Art

Fiber reinforced matrix composites such as metal matrix composites ("MMC's") are useful in applications where lightweight, strong, high temperature-resistant materials are needed. Such applications include turbine engine disks, rings, blades or actuators, and airframe structures where use temperatures are up to 900° C. Metal matrix composites typically provide superior stiffness, strength, fatigue resistance, and wear characteristics compared to unreinforced metals.

Conventional metal matrix composites employ large diameter (e.g., on the order of 100 micrometers) continuous fibers as reinforcement. The use of small diameter fiber tows would be desirable because such fibers typically are less expensive than large diameter continuous monofilaments.

SUMMARY OF THE INVENTION

In one aspect, the invention provides a fiber-reinforced composite having at least one tow in a metal matrix in which the tow includes a plurality of continuous ceramic fibers held together by a carbonaceous matrix.

In preferred embodiments, the metal matrix is titanium or an alloy thereof, or an intermetallic matrix. Preferred ceramic fibers include alumina fibers, aluminoborosilicate fibers, aluminosilicate fibers, silicon carbide fibers, and combinations thereof. The average diameter of the fibers in the tow ranges from about 1 to about 50 micrometers (preferably from about 10 to about 25 micrometers).

One or more of the fiber tows preferably includes a barrier coating deposited on the periphery of the tow. Examples of suitable barrier coatings include carbonaceous, metallic, metal oxide, metal boride, and metal carbide coatings, as well as combinations thereof. The thickness of the barrier coating is preferably greater than the reaction zone thickness of the fiber tow (e.g., from about 0.5 to about 5 micrometers).

In another aspect, the invention provides a method of preparing a fiber-reinforced composite that includes the steps of:

(a) impregnating a tow that includes continuous ceramic fibers with an organic resin which upon pyrolysis decomposes to form a carbonaceous matrix;

(b) pyrolyzing the impregnated fiber tow to form a carbonaceous matrix that holds the fibers together; and (c) incorporating the fiber tow into a metal matrix to provide a fiber-reinforced composite.

In preferred embodiments, the organic resin is a phenolic resin. One or more barrier coatings are preferably deposited (e.g., by chemical vapor deposition) on the periphery of the fiber tow prior to pyrolysis.

The fiber tow may be incorporated into the matrix, for example, by physical vapor deposition of metal on the fiber tow followed by consolidation, or by laminating the tow between metal foils.

In this application:

"Ceramic fibers" refers to glass, glass-ceramic, and/or crystalline ceramic fibers.

"Continuous fibers" refers to individual fibers of great or indefinite length. Although the exact length of the fibers is a function of the particular application to which the composite is put, in general fiber lengths are at least 10 cm, and may be several meters or more.

"Fiber tow" refers to a bundle of fibers.

"Carbonaceous" refers to carbon in which substantially all of the carbon is amorphous.

"Barrier coating" refers to a layer deposited on at least a portion of the periphery of the fiber tow that substantially prevents chemical reaction between the fibers and the metal matrix during composite fabrication or use.

"Reaction zone thickness" refers to the thickness of the region extending beyond the surface of the outermost fibers in the fiber tow in which the fibers can chemically react with the matrix during composite fabrication.

"Periphery" refers to the outer portion of the fiber tow which is available for coating.

"Matrix" refers to material extending continuously between and around reinforcing members (individual fibers in the case of the carbonaceous matrix and fiber tows in the case of the metal matrix). A "matrix" is thus distinct from binders in which discrete, discontinuous particles (e.g., powder particles) reside between reinforcing members.

"Intermetallic" refers to an alloy of two metals in which a progressive change in composition is accompanied by a progression of phases, differing in crystal structure.

The invention allows the incorporation of small diameter continuous fibers into metal matrices by bundling tows of fibers together with a carbonaceous matrix. The fibers then behave like larger diameter monofilaments. The diameter of the individual tows can be tailored to the needs of particular applications by controlling the number of fibers in the tow. Because the fibers in the interior of the tow are protected from reaction with the matrix, a barrier coating (if desired) need be present only at the periphery of the tow. In addition, the use of a carbonaceous matrix, in which the bonding between the matrix and fibers is typically weak compared to ceramic or metal matrices, enables the longitudinal strength of the fibers in the tow to be exploited.

Other features and advantages of the invention will be apparent from the following description of the preferred embodiments thereof, and from the claims.

DESCRIPTION OF THE PREFERRED EMBODIMENTS

Figure 1:
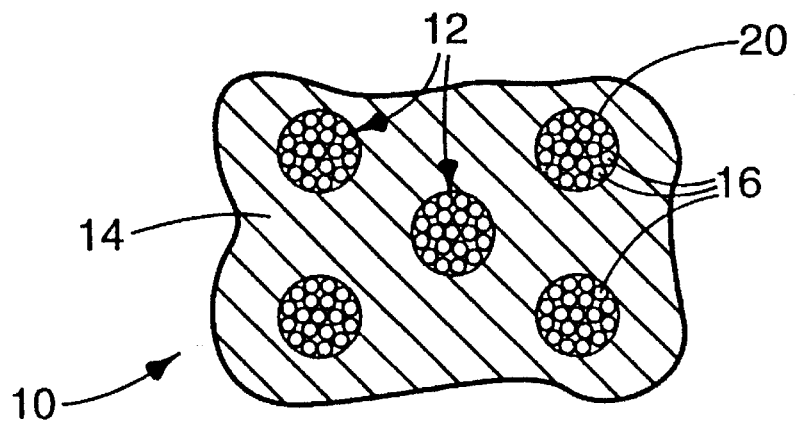
FIGS. 1 and 2 are schematic cross-sectional drawings of a fiber-reinforced composite according to the invention.
Figure 2:
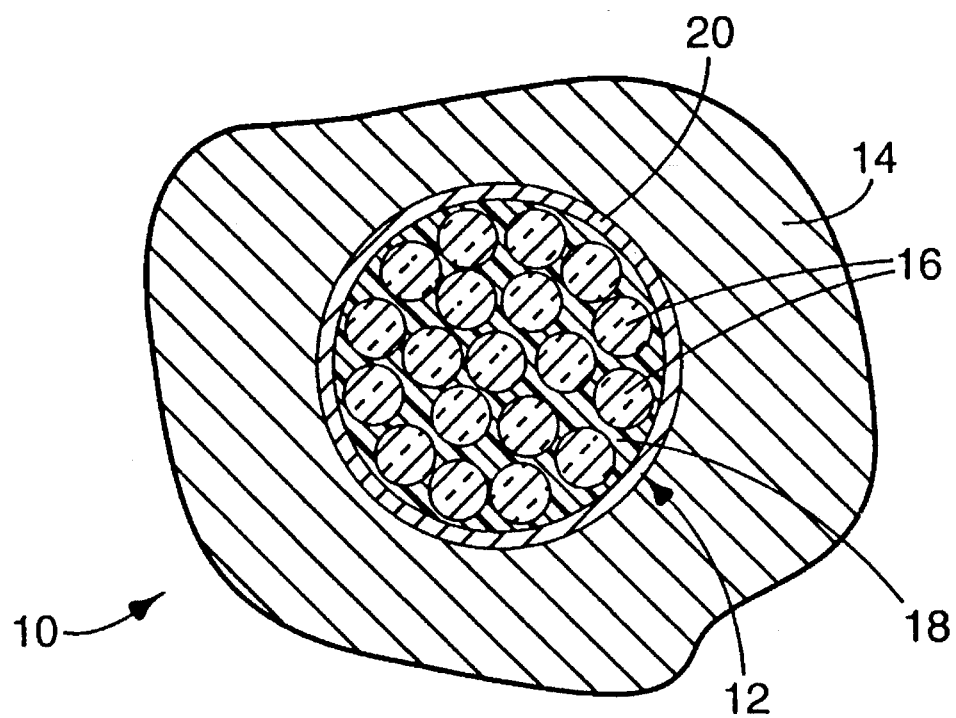

Referring to FIGS. 1 and 2, a composite according to the invention 10 features fiber tows 12 dispersed throughout a metal matrix 14. Each fiber tow comprises a plurality of individual continuous ceramic fibers 16 held together by a carbonaceous matrix 18 extending between and around the fibers. Matrix 18 weakly bonds the individual fibers together; however, because the bonding interaction between matrix 18 and the fibers is weak, the fibers typically will separate from matrix 18 upon fracture. Matrix 18 maintains the fibers within the tow aligned with each other, thereby stiffening or rigidifying the fibers. The fiber tow thus behaves as though it were a single filament, thereby making it easier to handle.

Examples of suitable ceramic fibers include ceramic oxide fibers commercially available in the form of fiber tows under the trademark "NEXTEL" ceramic fibers from 3M Company, St. Paul, Minn. Examples of these fibers include "Nextel 312" and "Nextel 440" aluminoborosilicate fibers, "Nextel 550" aluminosilicate fibers, and "Nextel 610" alumina fibers, with the alumina fibers being preferred.

Silicon carbide fibers may also be used as the ceramic fibers. Such fibers are commercially available, for example, as tows having 500–1000 fibers per tow, with individual fiber diameters ranging from about 10–12 micrometers, from Dow Corning of Midland, Mich. under the trade designation "Nicalon."

The diameters of individual fibers within each tow preferably range from about 1 to about 50 micrometers, and more preferably from about 10 to about 25 micrometers. The fibers may have circular or elliptical cross-sections. Preferably, there is a minimum number of crossed over and/or broken fiber ends within the tow, although it is sometimes desirable, in order to improve handling, to twist the tow periodically (e.g., once every 12 ft (30.6 cm)).

The carbonaceous matrix preferably is the carbonization product of an organic polymer resin. Examples of suitable organic polymer resins (which may be in the form of powders, dispersions, or liquid solutions) include epoxies, phenolics, polyethylenes, polypropylenes, polymethylmethacrylates, urethanes, cellulose acetates, polytetrafluoroethylene (PTFE), and natural and synthetic rubbers. The preferred binders for use in this invention are phenolics. Examples of commercially available phenolic resins include those sold under the trade designations "DUREZ" from Occidental Chemical Corp., Dallas, Tex.; "DURITE-SC-1008" from Borden Chemical, Columbus, Ohio; and "BKUA-2370-UCAR" (a water-based phenolic resin solution) from Union Carbide, Danbury, Conn. The viscosity of the resin can be adjusted by adding a compatible organic solvent such as acetone, methanol, or isopropanol to the resin, or by adding water to a water-based phenolic resin solution.

Matrix 14 is a metal matrix (e.g., titanium or an alloy thereof, or an intermetallic composition), with titanium and titanium alloys being preferred. Examples of suitable titanium alloys include (a) an alloy commercially available under the designation "Ti-6Al-4V" from Timet Co., Henderson, Nev. and (b) an alloy commercially available under the designation "Timetal 21S" from Timet Co., Henderson, Nev.

In order to minimize weakening of the fiber tows due to reaction between the fibers and the matrix, each fiber tow is preferably provided with a barrier coating 20; more than one barrier coating may be applied as well. Examples of suitable materials for barrier coating 20 include carbon, metals (e.g., palladium, platinum, or gold), metal oxides (e.g., yttria or erbia), metal borides (e.g., titanium diboride), and carbides (e.g., silicon carbide). The choice of the particular material for the barrier coating depends upon the reactivity of the fibers with the matrix in any given composite. In general, however, a preferred material for the barrier coating is carbon deposited by chemical vapor deposition.

The thickness of the barrier coating is chosen such that it exceeds the reaction zone thickness (as defined above). For example, if the metal matrix is made of titanium alloys and the barrier coating is made of carbon, the reaction zone thickness is preferably about 0.5 to about 1 micrometer. While the thickness of any given barrier coating depends on the kinetics of the reaction between matrix and fibers at the fabrication and use temperatures, the thickness of the barrier coating typically ranges from about 0.5 to about 5 micrometers.

Preferably, composites according to the invention are prepared in a sequential process, from reel to reel, in which impregnation with organic polymer resin is the first step and coating with a barrier layer is the last step prior to reeling the fiber tows on a drum in preparation for coating with metal matrix material.

The organic polymer resin preferably is coated onto the fiber tows in a continuous process in which the tows are dipped or pulled through a solution containing the resin to impregnate the tows with resin. One or more tows may be coated at one time. Following impregnation, the resin-coated tows are dried, preferably by feeding the tows through a tube furnace at a temperature preferably about 300° C. and at a rate sufficient to dry the tows.

After the resin-coated tows have been dried, the resin is carbonized according to conventional techniques by heating the tows in a furnace under a non-oxidizing atmosphere to form the carbonaceous matrix. Heating may be accomplished, for example, by resistive heating or inductive heating. Suitable non-oxidizing atmospheres may be provided, for example, by flowing a non-oxidizing gas (e.g., a reducing gas such as hydrogen), an inert gas (e.g., nitrogen or argon), or a combination thereof through the furnace chamber (which may be at, below, or above atmospheric pressure).

In a typical carbonization operation, the coated tows are fed through a tube furnace under a nitrogen atmosphere to carbonize the resin. Carbonization converts the organic polymer resin into a carbonaceous matrix that holds individual fibers in the tow together, enabling the tow to behave as a single filament and thereby enhancing processability. The volume fraction of carbon in each tow (i.e., the volume of carbon to volume of fiber) generally ranges from about 5% to about 30% based on the total volume of the carbonized tow.

Following carbonization, one or barrier coatings are applied if desired by chemical vapor deposition according to conventional techniques. Chemical vapor deposition may be carried out at reduced pressure or at atmospheric pressure, with atmospheric pressure being preferred. The tows are then incorporated into a metal matrix by conventional techniques, including foil-fiber-foil, powder-cloth, plasma spray, and physical vapor deposition techniques. A preferred method involves physical vapor deposition in which the metal matrix is deposited on the fiber tows using electron beam evaporation or sputtering.

Physical vapor deposition is most efficiently carried out in the form of a continuous process in which the carbonized tows are fed from a reel or spool and laid up, side-by-side, on a drum. The minimum tow spacing on the drum is determined by the metal matrix coating thickness that is desired for a given volume fraction of fiber in the composite. For example, in the case of alumina fiber tows having 112 fibers apiece, a minimum spacing of 60 micrometers between tows is preferred; such a spacing yields a metal matrix coating thickness of 10 to 30 micrometers. The fiber tows are clamped on the drum, reeled out onto the rotating drum to produce an even spacing, sectioned, and then removed for direct lay up in a stainless steel frame; alternatively, the tows can be positioned by hand in the frame. Within the frame, the tow ends are clamped down on the lengthwise edges of the frame. Several frames can be set up this way for physical vapor deposition of the metal matrix material.

The metal matrix material is deposited onto the laid-up fiber tows by, for example, magnetron sputtering or electron beam evaporation, as noted above. Following deposition, the resulting samples are consolidated by hot isostatic pressing (HIP) to densify the composite. At full density, the metal matrix is at least 99.9% of theoretical density, with no visible pores or voids. The hot isostatic pressing operation typically is performed using commercially available equipment (e.g., an "Eagle Six" Hot Isostatic Press commercially available from International Pressure Systems, Columbus, Ohio)) at temperatures ranging from about 600° C. to about 1200° C., and pressures of about 10 to about 200 MPa, for a time period ranging from about 1 to about 10 hours.

Following consolidation, the longitudinal tensile strength and modulus of each composite are determined.

The fiber-reinforced composites according to the invention typically has good composite properties (e.g., metal matrix ductility and fiber strength). Such composites are useful in applications in the aerospace, energy, and automotive industries, including jet aircraft nozzle flaps, airframe structures, and turbine blades.

Objects and advantages of this invention are further illustrated by the following examples, but the particular materials and amounts thereof recited in these examples, as well as other conditions and details, should not be construed to limit this invention.

EXAMPLES

Test Methods

The tensile strength of the fibers was measured using an Instron Model 4210 universal testing frame (Instron Corp., Canton, Mass.). Individual fibers were gripped using spring loaded clamps having 6 cm square rubber faces and tested to failure at a head speed of 0.05 cm/min.

The tensile strength of the fiber-reinforced composite was measured using an Instron Model 8500 universal testing frame (Instron Corp., Canton, Mass.) equipped with standard pneumatic tensile grips. To prepare the composite for testing, the composite was machined into a dog bone shape by masking the grip section with rubber tubing and then etching the remaining section by dipping the specimen into a bath containing 20 volume percent perchloric acid for 4 hours. The specimen measured 2.5 mm in diameter in the small diameter section and 5 cm in length. Each section of the specimen that was fitted into the grips of the testing frame measured 2.5 cm in length and 5 mm in diameter. The composite was tested to failure at a strain rate of 0.01 $min^{-1}$.

Example 1

A fiber-reinforced composite was prepared using an alumina fiber tow (commercially available under the trade designation "Nextel 610" ceramic fiber from 3M Company, St. Paul, Minn.). The tow contained 112 fibers. The individual fibers, which were round in cross-section, had diameters ranging from 10 to 14 micrometers. Fibers in the tow were well-aligned, with few broken or crossed-over fibers.

A phenolic resin solution was prepared by combining 3 parts by weight phenolic resin (commercially available under the trade designation "Durite SC1008" from Borden Chemical, Columbus, Ohio) with 1 part by weight isopropanol. A fiber tow was impregnated with the phenolic resin solution by feeding the tow at a rate of 50 cm/minute into a beaker containing the resin solution. Immediately after coating with phenolic resin, the tow was dried by feeding it at a rate of 50 cm/minute into a 25 cm tube furnace set at 300° C.

Next, the resin-impregnated tow was carbonized by feeding it through a 61 cm tube furnace (Lindberg model #54357) under nitrogen atmosphere at 1050° C. at the rate of 61 cm/minute. Carbonization yielded a tow sufficiently bound together by a carbonaceous matrix to allow the tow to be handled and treated as a single filament.

Following carbonization, the tow was coated with a barrier layer of carbon using chemical vapor deposition (CVD) at atmospheric pressure according to the procedure described in co-pending, commonly assigned, application U.S. Ser. No. 07/383,923 (Gabor et al.), now U.S. Pat. No. 5,364,660, entitled "Continuous Atmospheric Pressure CVD Coating of Fibers," which is hereby incorporated by reference. The tow was fed into a 50 cm tube furnace at a rate of 50 cm/minute. CVD carbon was produced by decomposition of a mixture of propane and methane at a temperature of 1060° C.; the propane and methane flow rates were 150 and 110 $cm^3$/minute, respectively. Throughout the deposition process, nitrogen was flushed through the tube furnace at a flow rate of 410 $cm^3$/minute to reduce oxidation of the carbon. The thickness of the resulting carbon layer (as measured by scanning electron microscopy using a Model S360 from Cambridge Instruments of Cambridge, England) ranged from 0.5 to 2 micrometers, depending on the particular region of the tow. The packing density of fibers in the tow was measured by image analysis using optical metallography to be about 60–80%.

To prepare a coated tow for lay up in a metal matrix, the tow was fed at a rate of 50 cm/minute onto a rotating drum having a diameter of 40 cm and a width of 25 cm. The carbonized tow was spirally wound on the drum with even spacing of about 0.1 mm between each winding. After approximately 300 windings, stainless steel clamps were positioned across the fiber tow on the drum to hold the fiber tow in place. Sections of the reeled-up tow were cut from the drum and removed with the steel clamps still in place. The clamped sections of the reeled-up tow were then laid flat in a stainless steel frame measuring 61 cm long by 20 cm wide. The sections of aligned tows were clamped down at both ends along the long dimension of the frame using two bars (each measuring 5 mm wide) that screwed into the frame and crossed over the tow sections to hold them down.

Next, the clamped sections of aligned tows were coated with a titanium alloy ("Timetal 21S" commercially available from Timet Co. of Henderson, Nev.) using an AC magnetron sputtering apparatus equipped with six sputter tubes. Each tube measured 23 cm long, and had inside and outside diameters of 1.5 cm and 2.5 cm, respectively. The tubes were positioned such that they were spaced 12.5 cm from each other and 3.8 cm away from the frames containing the cut portions of the tows. Sputtering was conducted for 45 minutes under an argon pressure of 3 mTorr at a power of 4 kW per tube to coat the tows with a titanium coating having a thickness of about 20–25 micrometers (as determined by scanning electron microscopy). The metal volume fraction was approximately 40%.

The metal-coated tow sections had sufficient integrity to be handled. The tow sections were bundled together and then consolidated by hot isostatic pressing (HIP) by packing the tow sections uniaxially into a cylindrical titanium tube (measuring 12 cm long and having inside and outside diameters of 0.3 cm and 12 cm, respectively). The titanium tubes were inserted into a Pyrex™ glass tube having a wall thickness of 2 mm, which was then evacuated to a pressure of no greater than about $5 \times 10^{-6}$ Torr. Following evacuation, the tubes were sealed and hot isostatically pressed in an HIP chamber ("Eagle Six" unit commercially available from International Pressure Systems, Columbus, Ohio) at a temperature of 850° C. and pressure of 100 MPa for 2 hours to form a fiber-reinforced composite.

Following hot isostatic pressing, the fiber-reinforced composite was cooled to room temperature, removed from the glass tube, and prepared for tensile testing, as described above under Test Procedures. Test results showed the composite had a longitudinal tensile strength in the range of 830 MPa to 1200 MPa, which was in accordance to the theoretical tensile strength predicted by rule-of-mixtures of 840 MPa to 1190 MPa. The composite modulus was measured to be approximately 193 GPa.

Example 2

A fiber-reinforced composite was prepared according to the method of Example 1 except that the alumina fiber tow contained 420 fibers. The composite of Example 2 had a longitudinal tensile strength of 1010 MPa and a modulus of 206 GPa.

Example 3

A fiber-reinforced composite was prepared according to the method of Example 1 except that the alumina fiber tow consisted of fibers having individual diameters ranging from 15 to 30 micrometers. The composite of Example 3 had a longitudinal tensile strength of 840 MPa and a modulus of 172 GPa.

Example 4

A fiber-reinforced composite was prepared according to the method of Example 1 except that the metal matrix material was a titanium alloy commercially available under the designation "Ti-6Al-4V" from Timet Co, of Henderson, Nev. The composite of Example 4 had a longitudinal tensile strength of 1010 MPa and a modulus of 210 GPa.

Example 5

A fiber reinforced composite was prepared as described in Example 1, except that the fiber tow was made of silicon carbide fibers, commercially available under the trade designation "Nicalon 1800" from Dow Corning of Midland, Mich. The tow included 500 fibers with a nominal diameter of 15 micrometers. The composite had a longitudinal tensile strength of 900 MPa and a modulus of 114 GPa.

Various modifications and alterations of this invention will become apparent to those skilled in the art without departing from the scope and spirit of this invention, and it should be understood that this invention is not to be limited to the illustrative embodiments set forth therein.

Other embodiments are within the following claims.

What is claimed is:

1. A fiber-reinforced composite comprising at least one tow in a metal matrix, said tow comprising a plurality of continuous ceramic fibers held together by a carbonaceous matrix wherein said continuous ceramic fibers have an average diameter of about 1 to about 50 micrometers.

2. The composite of claim 1 wherein said metal matrix comprises titanium or an alloy thereof.

3. The composite of claim 1 wherein said metal matrix comprises an intermetallic matrix.

4. The composite of claim 1 wherein said continuous ceramic fibers have an average diameter from about 10 to about 25 micrometers.

5. The composite of claim 1 wherein said fiber tow has a periphery coated with a barrier coating.

6. The composite of claim 5 wherein said barrier coating comprises a carbonaceous coating.

7. The composite of claim 5 wherein said barrier coating comprises a metallic coating.

8. The composite of claim 5 wherein said barrier coating is selected from the group consisting of metal oxides, metal borides, metal carbides, and combinations thereof.

9. The composite of claim 5 wherein said fiber tow is characterized as having a reaction zone thickness and said barrier coating has a thickness that is greater than the reaction zone thickness of said fiber tow.

10. The composite of claim 5 wherein said barrier coating has a thickness ranging from about 0.5 to about 5 micrometers.

11. The composite of claim 1 wherein said continuous ceramic fibers are selected from the group consisting of alumina fibers, aluminoborosilicate fibers, aluminosilicate fibers, silicon carbide fibers, and combinations thereof.

12. The composite of claim 1 wherein said continuous ceramic fibers comprise alumina fibers.

* * * * *